Figure 1:
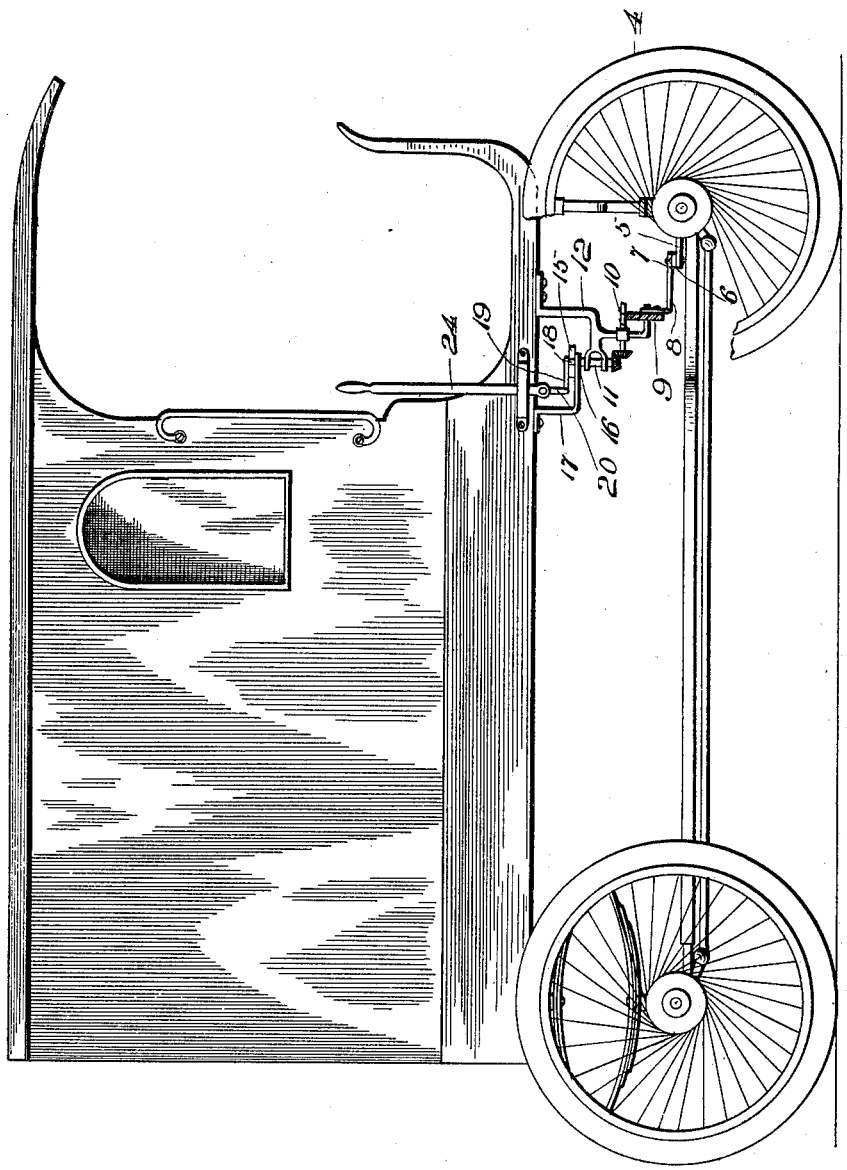

No. 707,435. Patented Aug. 19, 1902.
J. G. MacPHERSON.
STEERING GEAR FOR AUTOMOBILES.
(Application filed Oct. 26, 1901.)
(No Model.) 4 Sheets—Sheet 1.

Witnesses
Bernard M. Offutt
A. S. Cassell

Inventor
John G. MacPherson,
by David S. Moore, Attorney

No. 707,435. Patented Aug. 19, 1902.
J. G. MacPHERSON.
STEERING GEAR FOR AUTOMOBILES.
(Application filed Oct. 26, 1901.)
(No Model.) 4 Sheets—Sheet 2.

No. 707,435. Patented Aug. 19, 1902.
J. G. MacPHERSON.
STEERING GEAR FOR AUTOMOBILES.
(Application filed Oct. 26, 1901.)
(No Model.) 4 Sheets—Sheet 3.
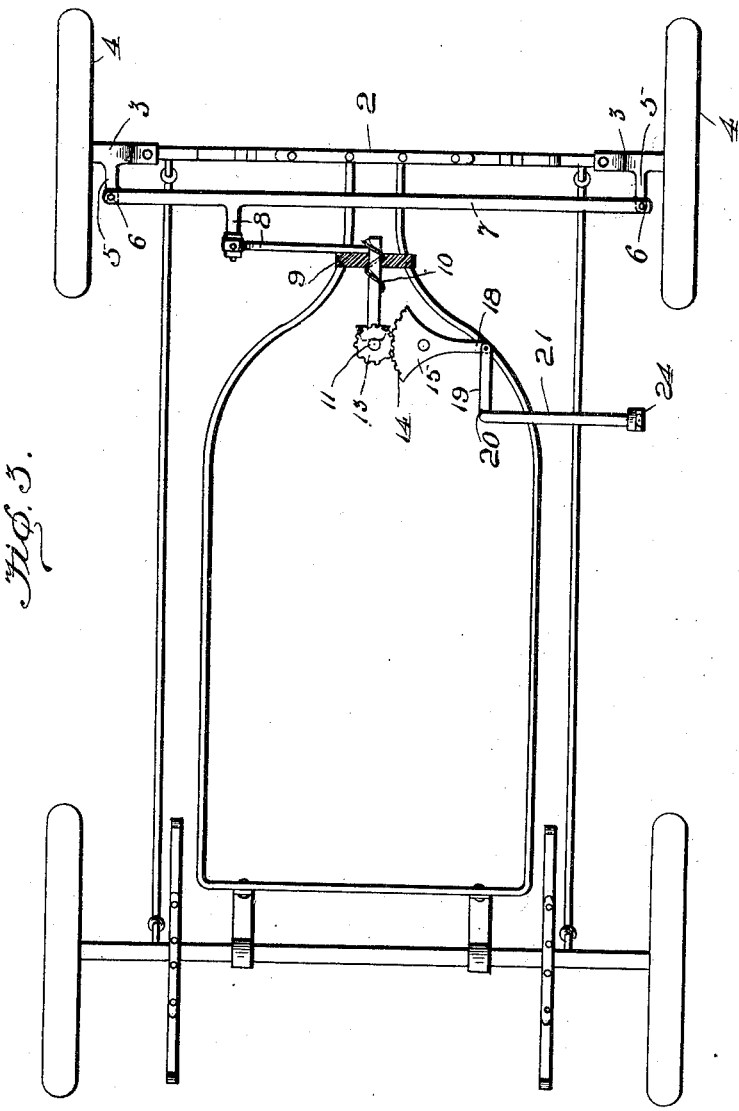

No. 707,435. Patented Aug. 19, 1902.
J. G. MacPHERSON.
STEERING GEAR FOR AUTOMOBILES.
(Application filed Oct. 26, 1901.)
(No Model.) 4 Sheets—Sheet 4.
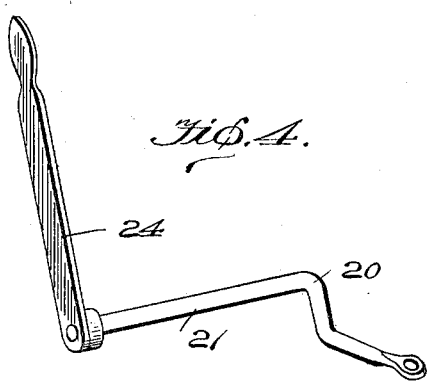
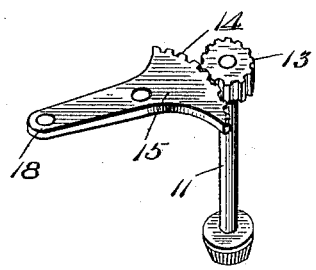
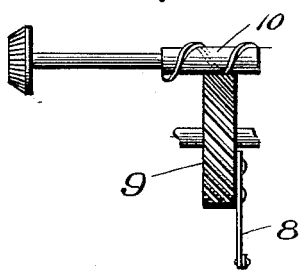
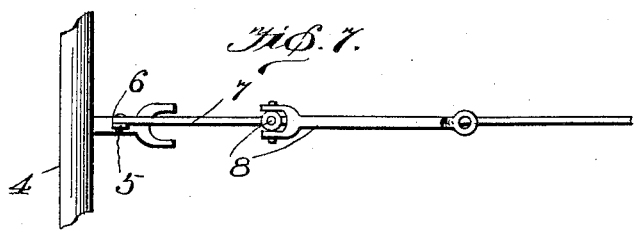

UNITED STATES PATENT OFFICE.

JOHN G. MacPHERSON, OF PHILADELPHIA, PENNSYLVANIA, ASSIGNOR TO MacPHERSON AUTOMOBILE COMPANY, OF PHILADELPHIA, PENNSYLVANIA.

STEERING-GEAR FOR AUTOMOBILES.

SPECIFICATION forming part of Letters Patent No. 707,435, dated August 19, 1902.

Application filed October 26, 1901. Serial No. 80,120. (No model.)

*To all whom it may concern:*

Be it known that I, JOHN G. MACPHERSON, a citizen of the United States, residing at Philadelphia, in the county of Philadelphia and State of Pennsylvania, have invented certain new and useful Improvements in Steering-Gear for Automobiles, of which the following is a specification.

This invention relates to improvements in steering-gear for automobiles; and the main object of my invention is the provision of a steering-gear which is quickly and easily operated and which will at all times relieve the strain placed upon the hand of the operator with all gears now in use.

Another object of my invention is the provision of a steering-gear whose operating-lever is so arranged and constructed as to allow the operator to pull or push it instead of turning a lever or wheel, as is the customary manner of steering.

Another object of my invention is the provision of a steering mechanism which will by a very little comparative movement of the lever cause the wheels to be readily moved and retain them at their proper angle without the operator still retaining the handle in his hand.

Another object of my invention is the provision of a positive mechanism operated by the vertical lever, which will positively operate the wheels to steer the automobile and takes all strain from the operating-lever, which remains at any position when released by the operator, so that the automobile will keep its course regardless of obstacles.

Another object of my invention is the provision of a steering-gear which will cause the automobile to respond quickly to the slightest touch of the operator and has, by way of illustration, the same difference of quick effectual manipulation as between a lever and wheel throttle compared with the steering methods now in use, and that it will also be impossible for the hand-lever to be wrenched from the operator's hand, thus preventing such serious results that might happen thereby.

Another object of my invention is the provision of an automobile steering-gear which is the embodiment of simplicity, durability, and inexpensiveness, thus producing a thoroughly efficient and practical device.

To attain the desired objects, my invention consists of a steering-gear for automobiles embodying novel features of construction and combination of parts, substantially as disclosed herein.

Figure 2:
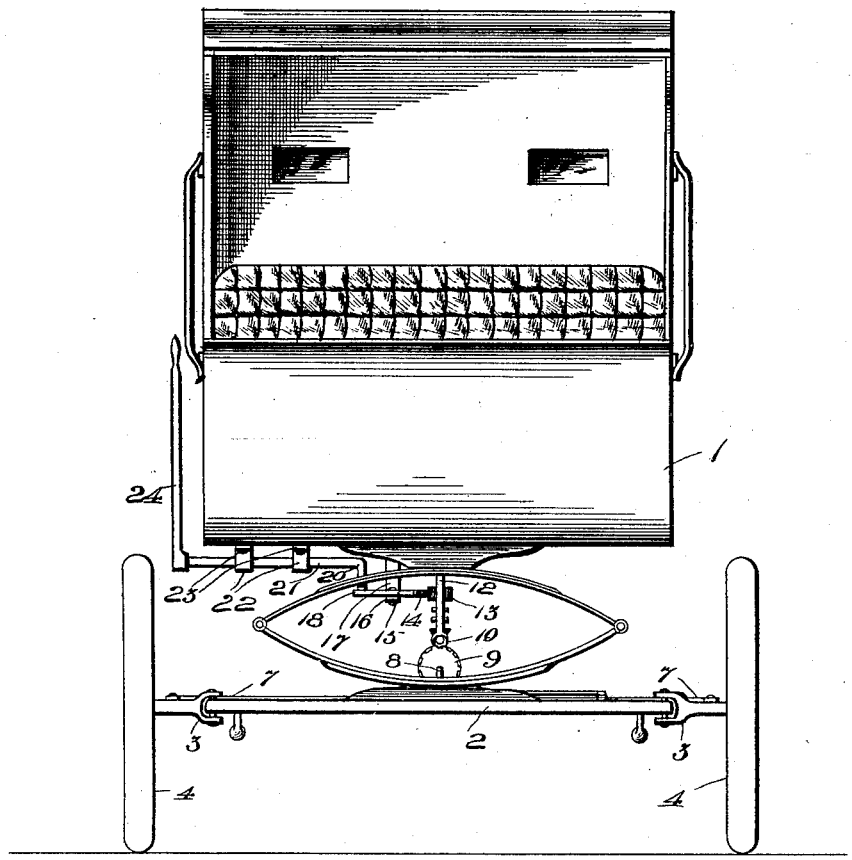

In the drawings, Figure 1 is a side elevation of an automobile with my steering-gear in use thereon. Fig. 2 is a front elevation of an automobile with the steering-gear thereon. Fig. 3 is a top plan view of the running-gear and the steering-gear in position. Fig. 4 is an enlarged detail view of the operating-lever. Fig. 5 is a similar view of the segment and shaft carrying pinions. Fig. 6 is a detail view of the worm-gear and connections, and Fig. 7 is a detail view of the steering-lever and connections with the front wheels.

Referring by numerals to the drawings, the numeral 1 designates the body of the automobile, 2 the stationary front axle, and 3 the short swiveled axle, carrying the front wheels 4. Formed rigid with and extending rearwardly from the axles 3 are the arms or levers 5, whose outer ends are, by means of pivotal joints 6, connected to the connecting-rod 7. This rod 7 has connected thereto, so as to give it a movement from one side to the other, an arm 8, which is further connected to the gear-wheel 9, which is operated by the worm-gear 10, operated by the lower end of the vertical shaft 11, journaled in the depending bracket 12. Upon the upper end of the shaft 11 is carried the small spur-gear 13, which meshes with the teeth 14 of the segmental gear 15, which is mounted in the arms 16 of the depending bracket 17, so that its outer end of the arm 18 may be pivotally connected to the rod 19, which is connected to the end of the bell-crank lever 20. The main portion of body 21 of the bell-crank lever is journaled in the bearings 22 of the brackets 23, and connected rigidly to and extending upward at one side of the vehicle-body is the lever or operator's handle 24 for imparting motion to the entire mechanism.

The shaft 11, carrying the spur-gear and operating the worm, has its gears so constructed that it is revolved five times when the segmental gear has been moved its full distance, and the gear-wheel 9 is large enough to be turned one-third its circumference by the worm-gear 10 to more easily and quickly steer or operate the swiveled axles of the front wheels.

From the foregoing description, taken in connection with the drawings, the operation of my improved steering-gear for automobiles will be readily understood and its numerous advantages be fully appreciated; but the operation, briefly stated, is as follows: The hand-lever is at dead-center—that is, it is perpendicular to the plane of the road. The wheels of the automobile are all parallel. To steer the vehicle to right or left, it is simply necessary to push or pull upon the lever, which imparts motion to the segmental gear, which in turn revolves the shaft 11, causing the worm-gear 10 to impart motion to the large gear-wheel 9, which, by reason of moving its arm 8, causes the rod 7 to swing the levers 5, which in turn turns the swiveled axles, and thus the front wheels. It will thus be seen that the particular advantages obtained by this construction and arrangement of parts is that all strain is removed from the operating-lever, and consequently against the operator's hand; that the automobile will keep its course regardless of obstacles, as the gears are positive in their movement and also their passive position, thus allowing the operator to remove his hand from the lever, if necessary, without running any great risks; that the automobile responds quickly to the slightest touch of the operator, and that by the arrangement of the operating-lever much space is saved and the steering-gear or its lever is never in the way in getting in or out of the automobile. It further adds in attractiveness to the automobile and is always at hand where the operator can operate it from the most comfortable position.

It is evident that I have produced a steering-gear for automobiles which is very simple and durable in construction, which is easily and quickly operated, and which is thoroughly efficient and practical in use.

What I claim as new, and desire to secure by Letters Patent of the United States, is—

1. In combination with a vehicle, of a steering-gear therefor comprising a hand-lever, a bell-crank lever operated thereby, a segmental gear operated by said bell-crank lever, a vertical shaft, a gear carried thereby and meshing with said segmental gear, a worm-gear operated by said shaft, a large gear meshing with said worm-gear, and means operated by said large gear to steer the front wheels of the vehicle.

2. In combination with a vehicle of a steering-gear therefor comprising a hand-lever, a bell-crank lever operated thereby, a segmental gear operated by said bell-crank lever, a vertical shaft, a gear carried thereby and meshing with said segmental gear, a worm-gear operated by said shaft, a large gear meshing with said worm-gear, a rod or arm connected to said large gear, and means connected to said arm for steering the front wheels of the vehicle.

3. In combination with a vehicle of a steering-gear therefor comprising a hand-lever, a bell-crank lever operated thereby, a segmental gear operated by said bell-crank lever, a vertical shaft, a gear carried thereby and meshing with said segmental gear, a worm-gear operated by said shaft, a large gear meshing with said worm-gear, a rod or arm connected to said large gear, a connecting-rod connected to said arm, and levers carried by the front wheels' axles connected to the connecting-rod so as to be moved in unison.

In testimony whereof I affix my signature in presence of two witnesses.

JOHN G. MacPHERSON.

Witnesses:
ISAAC H. ROCAP,
SAML. B. S. BARTH.